(12) United States Patent
Yamagishi

(10) Patent No.: US 10,311,546 B2
(45) Date of Patent: Jun. 4, 2019

(54) EDGE DETECTION APPARATUS AND EDGE DETECTION METHOD

(71) Applicant: CANON KABUSHIKI KAISHA, Tokyo (JP)

(72) Inventor: Masaharu Yamagishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 15/362,167

(22) Filed: Nov. 28, 2016

(65) Prior Publication Data

US 2017/0178337 A1 Jun. 22, 2017

(30) Foreign Application Priority Data

Dec. 21, 2015 (JP) .................................. 2015-248321

(51) Int. Cl.
*G06T 3/40* (2006.01)
*G06T 7/13* (2017.01)
*G06T 7/136* (2017.01)

(52) U.S. Cl.
CPC ................. *G06T 3/40* (2013.01); *G06T 7/13* (2017.01); *G06T 7/136* (2017.01); *G06T 2207/10004* (2013.01); *G06T 2207/20021* (2013.01)

(58) Field of Classification Search
CPC .. G06T 3/40; G06T 7/136; G06T 7/13; G06T 2207/10004; G06T 2207/20021
See application file for complete search history.

(56) References Cited

U.S. PATENT DOCUMENTS 7,532,774 B2    5/2009  Hori et al.
2013/0223756 A1*  8/2013  Iketani ................... H04N 1/393
                                                382/260

FOREIGN PATENT DOCUMENTS

JP      S60-105081 A      6/1985
JP      2006-033647 A     2/2006
JP      3826412 B2   *    9/2006

* cited by examiner

*Primary Examiner* — Menatoallah Youssef
(74) *Attorney, Agent, or Firm* — Venable LLP

(57) ABSTRACT

An edge detection apparatus according to the present invention, includes: a detection unit configured to detect a dispersion degree of gradation values of input image data; a determination unit configured to determine detection sensitivity, which is edge detectability, based on the dispersion degree detected by the detection unit; and an edge detection unit configured to detect an edge from an input image based on the input image data, at the detection sensitivity determined by the determination unit, wherein in a case where the dispersion degree is low, the determination unit determines a lower detection sensitivity, compared with a case where the dispersion degree is high.

19 Claims, 13 Drawing Sheets

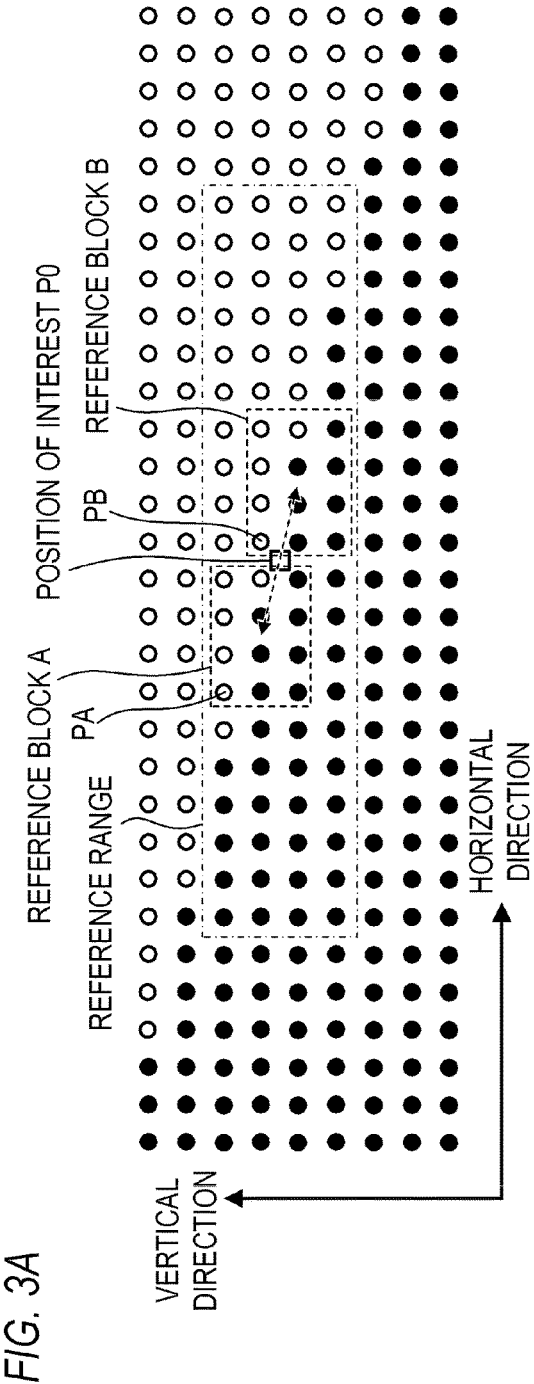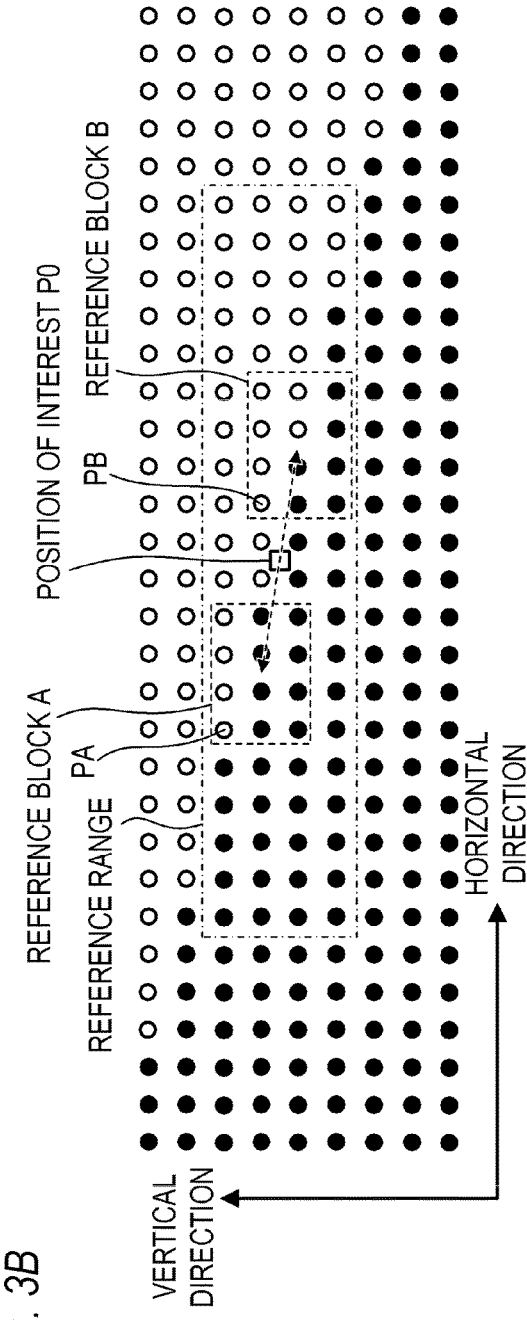

FIG. 14

| RANGE INFORMATION | SIZE OF DISPERSION DETECTION REGION |
|---|---|
| RANGE_A | 3×3 |
| RANGE_B | 5×5 |
| RANGE_C | 7×7 |
| RANGE_D | 9×9 |

EDGE DETECTION APPARATUS AND EDGE DETECTION METHOD

BACKGROUND OF THE INVENTION

Field of the Invention

The present invention relates to an edge detection apparatus and an edge detection method.

Description of the Related Art

Recently the use of an image display apparatus that can display high resolution images, the resolution of which is higher than conventional apparatuses, is spreading. Among high resolution images, an image, of which the number of pixels in the horizontal direction is about 4000 (e.g. an image having 4096 pixels in the horizontal direction×2160 pixels in the vertical direction) is called a "4 k image" in general. If the resolution of the input image data to be input to the image display apparatus is different from the screen resolution of the image display apparatus, the resolution of the input image data must be converted into a resolution that is the same as the screen resolution of the image display apparatus.

An example of image processing to convert the resolution of the image data is scaler processing. Scaler processing is image processing to convert the resolution of the input image data by changing (enlarging or reducing) the image size of the input image data. If this image processing is performed using a common method (e.g. bicubic method), jaggies are generated in an image region on a diagonal edge (edge in the diagonal direction), and image quality drops considerably.

A technique to suppress the generation of jaggies is disclosed in Japanese Patent Application Laid-Open No. 2006-33647. In the technique disclosed in Japanese Patent Application Laid-Open No. 2006-33647, a diagonal edge is detected in an image, and for an image region of the diagonal edge, an interpolated pixel is generated using a pixel corresponding to the inclination angle of the diagonal edge (direction of the inclined edge). Further, in the technique disclosed in Japanese Patent Application Laid-Open No. 2006-33647, in a case where a correlation value indicating the presence of a diagonal edge is acquired for a position close to a position of interest and a position distant from the position of interest respectively, a diagonal edge is detected in the position of interest using the correlation value corresponding to the position close to the position of interest.

Here, if a correlation value corresponding to a position close to the position of interest is used with priority, an error occurs in the detection of the diagonal edge. For example, a diagonal line at a small angle, close to the horizontal line, included in a natural image, is a horizontal line in a case where the diagonal line is viewed locally; therefore this diagonal line (diagonal line at a shallow angle, close to the horizontal line, included in a natural image) and the actual horizontal line cannot be distinguished from each other, and this diagonal line is detected as the horizontal line by mistake. As a result, the generation of jaggies cannot be suppressed in the image region of this diagonal line.

Even in the case of a method which does not assign priority to the correlation value corresponding to a position close to the position of interest, a diagonal edge detection error could occur. For example, a correlation value indicating the presence of the diagonal edge may be detected by mistake, as a correlation value corresponding to a position of a character that is different from a character constituting the diagonal edge in the position of interest. As a result, an incorrect diagonal edge, based on an incorrect correlation value, is detected, and major image quality deterioration (image quality disturbance) is generated in the image region where the incorrect diagonal edge is detected.

SUMMARY OF THE INVENTION

The present invention provides a technique to detect an edge at higher precision.

The present invention in its first aspect provides an edge detection apparatus, comprising:

a detection unit configured to detect a dispersion degree of gradation values of input image data;

a determination unit configured to determine detection sensitivity, which is edge detectability, based on the dispersion degree detected by the detection unit; and an edge detection unit configured to detect an edge from an input image based on the input image data, at the detection sensitivity determined by the determination unit, wherein in a case where the dispersion degree is low, the determination unit determines a lower detection sensitivity, compared with a case where the dispersion degree is high.

The present invention in its second aspect provides an edge detection method, comprising:

a detection step of detecting a dispersion degree of gradation values of input image data;

a determination step of determining detection sensitivity, which is edge detectability, based on the dispersion degree detected in the detection step; and an edge detection step of detecting an edge from an input image based on the input image data, at the detection sensitivity determined in the determination step, wherein in a case where the dispersion degree is low, in the determination step, a lower detection sensitivity is determined compared with a case where the dispersion degree is high.

The present invention in its third aspect provides a non-transitory computer readable medium that stores a program, wherein the program causes a computer to execute:
  a detection step of detecting a dispersion degree of gradation values of input image data;
  a determination step of determining detection sensitivity, which is edge detectability, based on the dispersion degree detected in the detection step; and
  an edge detection step of detecting an edge from an input image based on the input image data, at the detection sensitivity determined in the determination step, and
  in a case where the dispersion degree is low, in the determination step, a lower detection sensitivity is determined compared with a case where the dispersion degree is high.

According to the present invention, an edge can be detected at higher precision.

Further features of the present invention will become apparent from the following description of exemplary embodiments with reference to the attached drawings.

BRIEF DESCRIPTION OF THE DRAWINGS

FIGS. 3A and 3B are diagrams depicting an example of a reference block pair according to Example 1;

FIG. 14 shows an example of a relationship between range information and dispersion detection region size according to Example 3.

DESCRIPTION OF THE EMBODIMENTS

Example 1

Example 1 of the present invention will now be described. In the following description, an example of installing an edge detection apparatus, according to this example, in an image processing apparatus that can execute scaler processing to convert the resolution of image data by changing (either enlarging or reducing) the image size of the image data, will be described. The image processing executed by the image processing apparatus is not limited to scaler processing. For example, blur processing, edge enhancement processing, brightness conversion processing, color conversion processing and the like may be performed as the image processing. The edge detection apparatus may be an independent apparatus that is separated from the image processing apparatus.

Figure 1:
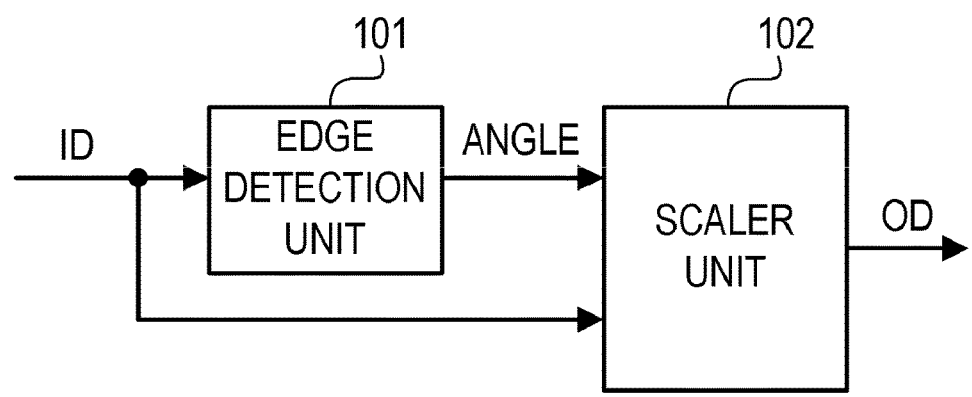
FIG. 1 is a block diagram depicting an example of a configuration of an image processing apparatus according to Example 1.

FIG. 1 is a block diagram depicting an example of a configuration of the image processing apparatus according to this example. As shown in FIG. 1, the image processing apparatus according to this example has an edge detection unit 101 and a scaler unit 102.

Using an input image data ID, the edge detection unit 101 detects an edge in an input image, which is an image based on an input image data ID. The edge detection method is not especially limited, but in this example, an edge is detected based on the result of block matching, which compares input images in 2 reference blocks while changing the positions (positions in the horizontal direction; horizontal positions) of the 2 reference blocks. The horizontal direction can be various directions, including a virtual direction and a diagonal direction, if the orientation of the image is changed. The edge detection unit 101 outputs the angle information ANGLE to the scaler unit 102 as a result of the edge detection.

The angle information ANGLE indicates whether or not an edge exists at each position of interest that is set in the input image, and the direction of the edge existing in the positions of interest if such an edge exists. In this example, the edge detection unit 101 outputs a value in the −16 to +16 range as the angle information ANGLE. In concrete terms, the edge detection unit 101 outputs a value representing the inclination angle of an edge, with respect to the vertical direction, as the angle information ANGLE at a position where an edge exists. Then the edge detection unit 101 outputs "0" as the angle information ANGLE at a position where an edge does not exist. The method for representing the direction of an edge is not limited to the above method (inclination angle of an edge with respect to the vertical direction). For example, the direction of an edge may be represented by the inclination angle of the edge with respect to the horizontal direction.

The scaler unit 102 performs the scaler processing that converts the resolution of the input image data ID based on the angle information ANGLE, whereby image data OD (input image after the resolution is converted) is generated. Then the scaler unit 102 outputs the generated image data OD. The image data OD is recorded in a storage unit (not illustrated), or is displayed on a display unit (not illustrated).

Figure 2:
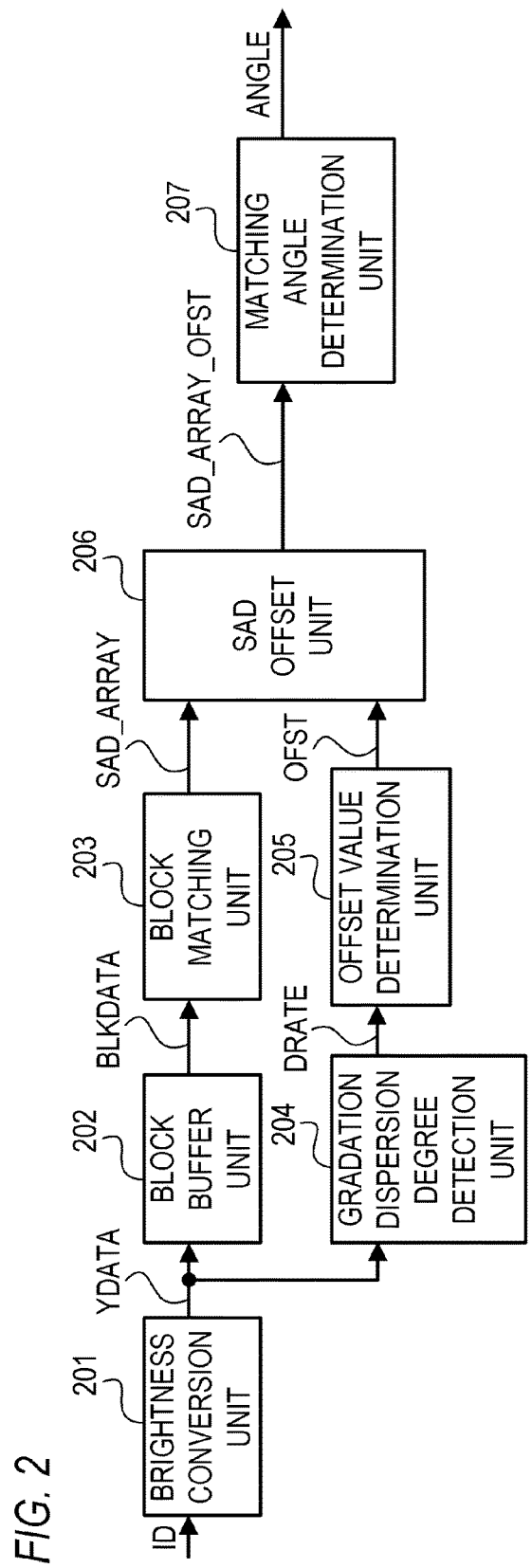
FIG. 2 is a diagram depicting an example of a configuration of an edge detection unit according to Example 1.

The edge detection unit 101 will now be described in detail. FIG. 2 is a block diagram depicting an example of a configuration of the edge detection unit 101. As FIG. 2 shows, the edge detection unit 101 has a brightness conversion unit 201, a block buffer unit 202, a block matching unit 203, a gradation dispersion degree detection unit 204, an offset value determination unit 205, a SAD offset unit 206 and a matching angle determination unit 207.

The brightness conversion unit 201 converts each pixel value of the input image data ID into the brightness value YDATA, and sequentially outputs each brightness value YDATA to the block buffer unit 202 and the gradation dispersion degree detection unit 204. If the pixel values of the input image data ID are YCbCr values (a combination of Y, Cb and Cr values), the brightness conversion unit 201 uses the Y value of the input image data ID as the brightness value YDATA. If the pixel values of the input image data ID are RGB values (a combination of the R, G and B values), the brightness conversion unit 201 converts the RGB values of the input image data ID into the brightness value YDATA. For example, the brightness value YDATA is calculated using the following Expression 1.

$$YDATA = 0.2 \times Rvalue + 0.7 \times Gvalue + 0.1 \times Bvalue \quad \text{(Expression 1)}$$

The block buffer unit 202 stores the brightness value YDATA output from the brightness conversion unit 201, and outputs the stored brightness value YDATA to the block matching unit 203. In this example, the block buffer unit 202 has 4 lines of line memories, and stores the brightness values YDATA (4 lines of brightness values YDATA) to the 4 lines of the line memories. Then the block buffer unit 202 reads the brightness value YDATA of the X1 pixels in the horizontal direction×Y1 lines in the vertical direction, and outputs the read brightness value YDATA to the block matching unit 203 as the block data BLKDATA. In this example, a case of X1=20 and Y1=4 will be described. A number of lines, which the line memory can store, and the image region size (number of pixels) of the block data BLKDATA, are not especially limited.

For example, the brightness value YDATA stored in the line memory and the block data BLKDATA, read from the line memory, are updated each time the brightness value YDATA is output from the brightness conversion unit 201. As the block data BLKDATA is updated, the position of interest is also updated. The positional relationship between the position of interest and the image region corresponding to the block data BLKDATA is not especially limited. In this example, the center position of the image region corresponding to the block data BLKDATA is used as the position of interest.

As shown in FIGS. 3A and 3B, the block matching unit 203 sets 2 reference blocks A and B with respect to the position of interest P0, and compares an image (brightness value YDATA) in the reference block A and an image in the reference block B. In concrete terms, for each of a plurality of pixels of the reference block A, the block matching unit 203 calculates the absolute value of the difference (absolute difference) between the brightness value YDATA of this pixel and the brightness value YDATA of the reference block B. To determine the absolute difference for a pixel PA of the reference block A, a pixel PB, of which positional relationships with the reference block B is the same as the positional relationship between the reference block A and the pixel PA, in the plurality of pixels of the reference block B is used. Then the block matching unit 203 calculates an SAP value (sum of absolute differences), which is the sum of a plurality of acquired absolute differences. The SAD value corresponds to a dissimilarity (reciprocal of similarity) between the input image in the reference block A and the input image in the reference block B. The center position of the reference block A is located above the position of interest P0, and the center position of the reference block B is located below the position of interest P0. The center position of the reference block pair (a combination of reference block A and reference block B) in the horizontal direction matches with the horizontal position of the position of interest P0. The positional relationship between the reference blocks A and B corresponds to a candidate of a direction (candidate direction) of an edge.

The block matching unit 203 calculates a plurality of SAD values while changing the horizontal positions of the reference blocks A and B. The horizontal positions of the reference blocks A and B are changed within an image region (within the reference range) of the block data BLKDATA. In this example, the block matching unit 203 sets 17 reference block pairs of which block distance is −16, −14, −12, −10, −8, −6, −4. −2, 0, +2, +4, +6, +8, +10, +12, +14 and +16. Then the block matching unit 203 calculates 17 SAD values SAD_ARRAY (n) (n is a block distance) corresponding to the 17 reference block pairs, and outputs the plurality (17) of SAD values, which are calculated for each target position, to the SAD offset unit 206. The absolute value of the block distance n is a distance in the horizontal direction, between the center position of the reference block A and the center position of the reference block B.

In this example, a positive value is used as the block distance n if the center position of the reference block A is located on the right side of the position of interest P0. And a negative value is used for the block distance n if the center position of the reference block A is located on the left side of the position of interest P0. FIG. 3A shows a case of block distance n=−4. FIG. 3B shows a case of block distance n=−6. As the absolute value of the block distance n increases, the angle of the corresponding candidate direction, with respect to the vertical direction, increases. In this example, an image region of 4 pixels in the horizontal direction×3 pixels in the vertical direction is set as the reference blocks A and B respectively, as shown in FIGS. 3A and 3B. And 2 reference blocks, which are shifted in the vertical direction by 1 pixels, are set as the reference blocks A and B.

The size of the reference blocks A and B, the positional relationship between the reference block A and the reference block B in the vertical direction, the shape of the reference blocks A and B and the like are not especially limited. For example, the size of the reference blocks A and B may be larger or smaller than 4 pixels in horizontal direction×3 pixels in vertical direction. The distance of the shift between the reference block A and the reference block B in the vertical direction may be longer than 1 pixel. The shape of the reference blocks A and B may be a triangle, a pentagon, a hexagon, a rectangle, a trapezoid, a rhombus, a circle (perfect circle or ellipse) or the like.

The gradation dispersion degree detection unit 204 detects the degree of dispersion of the gradation values of the input image data ID. Hereafter the degree of dispersion of the gradation values of the input image data ID is called a "gradation dispersion degree". The gradation dispersion degree detection unit 204 outputs the gradation dispersion degree to the offset value determination unit 205. In this example, the degree of dispersion of the brightness value YDATA is detected as the gradation dispersion degree. The gradation dispersion degree is not limited to the degree of the dispersion of the brightness value YDATA. For example, the gradation dispersion degree may be a degree of dispersion of the Cb value, a degree of dispersion of the Cr value, a degree of dispersion of the R value, a degree of dispersion of the G value, a degree of dispersion of the B value or the like. The gradation dispersion degree may be a degree of dispersion of a plurality of types of gradation values. The gradation dispersion degree can be regarded as a degree of variation of the gradation values. The image data having a high gradation dispersion degree can be regarded as image data having a low binarization degree.

In this example, the gradation dispersion degree detection unit 204 detects, as the gradation dispersion degree, a degree of dispersion of the brightness values YDATA in a predetermined image region. In this example, the predetermined image region is a part of the image region of the input image (image region of X2 pixels in horizontal direction×Y2 pixels in vertical direction), and is updated each time the position of interest is updated. In concrete terms, an image region of 5 pixels in the horizontal direction×5 pixels in the vertical direction, located in the periphery of the position of interest, is set as the predetermined image region.

The size of the predetermined image region, the positional relationship between the predetermined image region and the position of interest, the shape of the predetermined image region and the like are not especially limited. For example, the size of the predetermined image region may be larger or smaller than the 5 pixels in the horizontal direction×5 pixels in the vertical direction. In terms of the processing load of edge detection, it is preferable that the predetermined image region is small, and in terms of the accuracy of edge detection, it is preferable that the predetermined region is relatively large. Therefore the size of the predetermined image region should be determined considering the processing load of the edge detection and the accuracy. The predetermined image region may be an image region that does not include the position of interest. A common image region shared by a plurality of positions of interest may be used as the predetermined image region. The entire image region of the input image may be used as the predetermined image region. The shape of the predetermined image region may be a triangle, a pentagon, a hexagon, a rectangle, a trapezoid, a rhombus, a circle (perfect circle or ellipse) or the like.

First the gradation dispersion degree detection unit 204 generates a histogram of the brightness value YDATA (brightness histogram) from the brightness value YDATA in a predetermined image region (brightness values YDATA for 25 pixels: 5 pixels in horizontal direction×5 pixels in vertical direction), output from the brightness conversion unit 201. In this example, the brightness histogram, of which number of bits of each category is 8 bits, is generated. Therefore if a number of bits of the brightness value YDATA is 8 bits or less, the brightness histogram is directly generated using the brightness value YDATA. If the number of bits of the brightness value YDATA is more than 8 bits, the number of bits of the brightness value YDATA is converted into 8 bits by rounding down the lower bits of the brightness value DATA. Then the brightness histogram is generated using the converted brightness value YDATA (8-bit value). A number of bits of each category may be more or less than 8 bits. A number of bits of each category corresponds to the size of the range of the brightness values YDATA included in the category.

Then, the gradation dispersion degree detection unit 204 calculates the sum of the frequencies (number of pixels) of N number of categories (N is 2 or greater integer) in sequence from the category having a highest frequency, in a plurality of categories of the generated brightness histogram. The value of N is not especially limited, and N=2 is used for this example. The gradation dispersion degree detection unit 204 detects, from the generated brightness histogram, the frequency D1st, which is the frequency of the category having the highest frequency, and the frequency D2nd, which is the frequency of the category having the second highest frequency. Then the gradation dispersion degree detection unit 204 calculates the added frequency ADD by adding the frequency D2nd to the frequency D1st. The calculation formula of the added frequency ADD is the following Expression 2.

$$ADD=D1st+D2nd \quad \text{(Expression 2)}$$

Figure 4A:
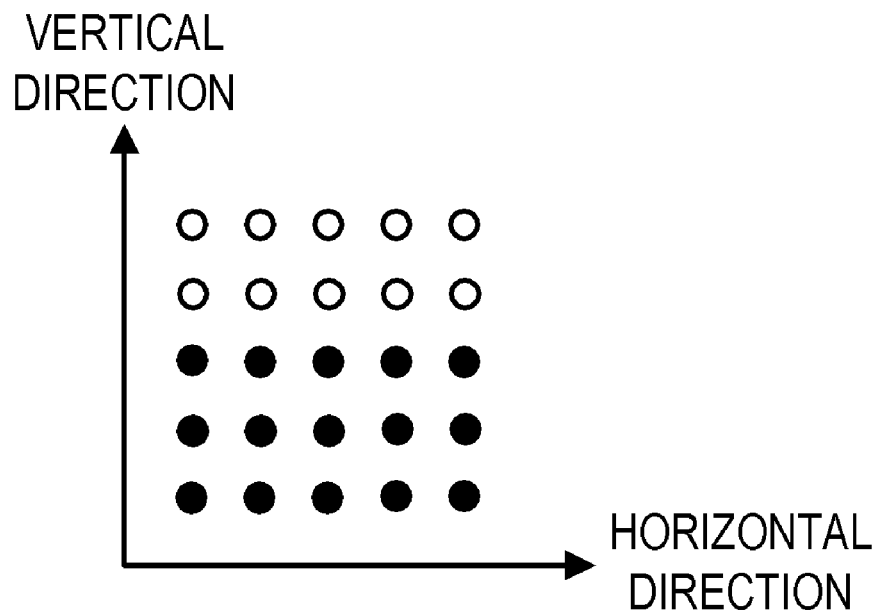
FIG. 4A shows an example of pixel arrangement according to Example 1.
Figure 4B:
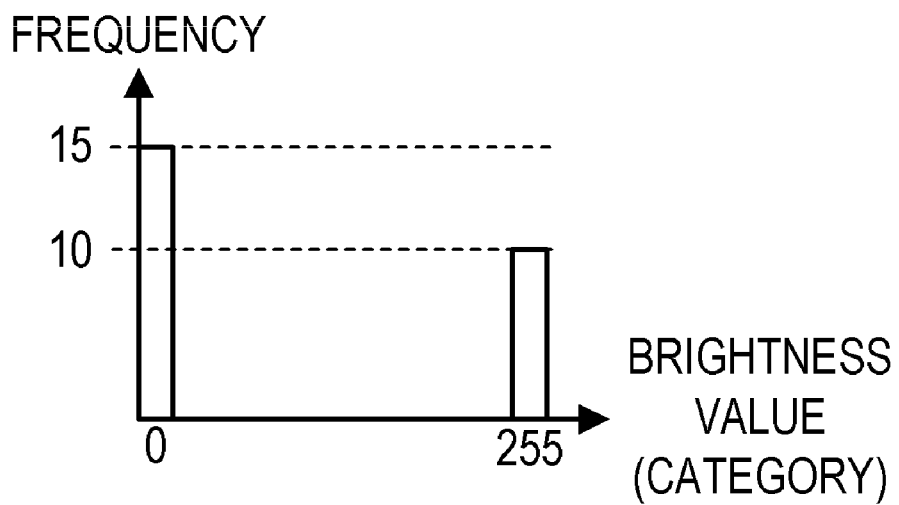
FIG. 4B shows an example of a brightness histogram according to Example 1.
Figure 5A:
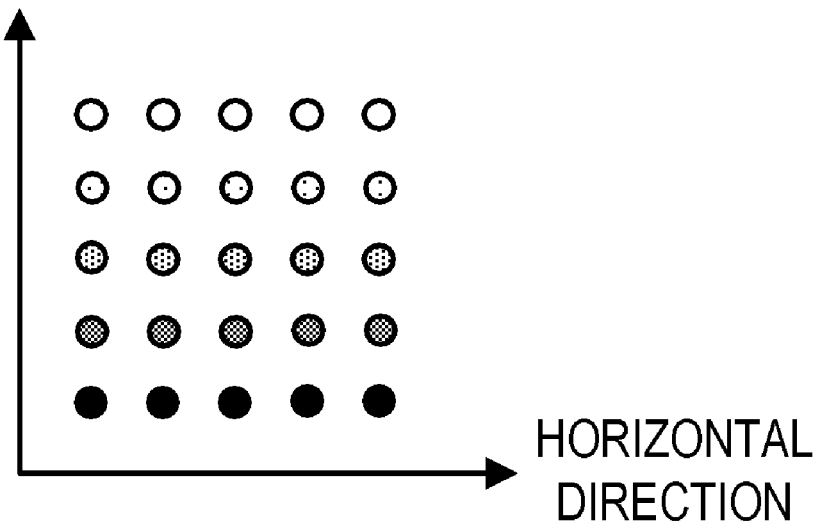
FIG. 5A shows an example of pixel arrangement according to Example 1.
Figure 5B:
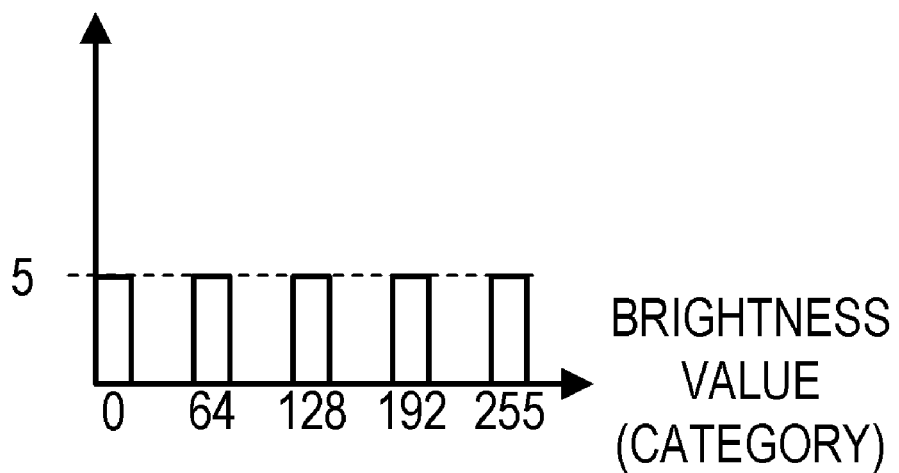
FIG. 5B shows an example of a brightness histogram according to Example 1.

FIGS. 4A and 5A show examples of pixels in a predetermined image region. In FIGS. 4A and 5A, each brightness value YDATA is expressed in monochrome, so that the color of each pixel changes from black to white as the brightness value YDATA increases. FIGS. 4B and 5B are examples of the brightness histogram. FIG. 4B shows the brightness histogram generated from the brightness values YDATA of the 25 pixels shown in FIG. 4A, and FIG. 5B shows the brightness histogram generated from the brightness values YDATA of the 25 pixels shown in FIG. 5A.

In the examples of FIGS. 4A and 4B, a number of gradation levels of the 25 pixels is 2. In concrete terms, in 25 pixels, 15 pixels are pixels having the brightness value YDATA=0, and 10 pixels are pixels having the brightness value YDATA=255. Therefore frequency 15 of the brightness value YDATA=0 is detected as the frequency D1st, and frequency 255 of the brightness value YDATA=255 is detected as the frequency D2nd, and the added frequency ADD=15+10=25 is calculated.

In the examples of FIGS. 5A and 5B, a number of gradation levels of the 25 pixels is 5. In concrete terms, 5 pixels are pixels having the brightness value YDATA=0, 5 pixels are pixels having the brightness value YDATA=64, 5 pixels are pixels having the brightness value YDATA=128, 5 pixels are pixels having the brightness value YDATA=192, and 5 pixels are pixels having the brightness value YDATA=255. Therefore frequency D1st=frequency D2nd=5 is detected, and the added frequency ADD=5+5=10 is calculated.

Then the gradation dispersion degree detection unit 204 converts the added frequency ADD into the gradation dispersion degree DRATE, and outputs the gradation dispersion degree DRATE to the offset value determination unit 205. In this example, in a case where the added frequency ADD is high, the gradation dispersion degree detection unit 204 determines a lower gradation dispersion degree DRATE, compared with the case where the added frequency ADD is low. In concrete terms, the gradation dispersion degree detection unit 204 converts the added frequency ADD into the gradation dispersion degree DRATE based on the correspondence shown in FIG. 6. According to the correspondence shown in FIG. 6, the added frequency ADD, that is a threshold ATH1 or lower, is converted into the gradation dispersion degree DRATE=1, and the added frequency ADD, that is a threshold ATH2 or higher, is converted into the gradation dispersion degree DRATE=0. The added frequency ADD that is higher than the threshold ATH1 and lower than the threshold ATH2 is converted into the gradation dispersion degree DRATE, so that the gradation dispersion degree DRATE linearly decreases from 1 to 0 as the added frequency ADD increases. In the example in FIG. 6, the threshold ATH1=6 and the threshold ATH2=18.

The thresholds ATH1 and ATH2 are not especially limited. The threshold ATH1 may be higher or lower than 6, and the threshold ATH2 may be higher or lower than 18. The thresholds ATH1 and ATH2 may be fixed values predetermined by the manufacturer, or may be values that the user can change. The thresholds ATH1 and ATH2 may be values determined by the image processing apparatus in accordance with the operation mode of the image processing apparatus, the type of the input image data ID and the like. The correspondence between the added frequency ADD and the gradation dispersion degree DRATE is not limited to the correspondence shown in FIG. 6. For example, the gradation dispersion degree DRATE may be decreased non-linearly as the added frequency ADD increases.

The method of determining the gradation dispersion degree DRATE is not limited to the above example. For example, the gradation dispersion degree DRATE may be determined based on the total number K of the categories of which frequency is higher than the threshold FTH, in the plurality of categories of the brightness histogram. In concrete terms, in a case where the total number K is low, the lower gradation dispersion degree DRATE may be determined, compared with the case where the total number K is high. Here if the threshold FTH=0, the total number K=2 is determined in the case of FIG. 4, and the total number K=5 is determined in the case of FIG. 5.

The threshold FTH may be a fixed value predetermined by the manufacturer or may be a value that can be changed by the user. The threshold FTH may be a value determined by the image processing apparatus in accordance with the operation mode of the image processing apparatus, the type of the input image data ID and the like. The correlation between the total number K and the gradation dispersion degree DRATE is not especially limited.

The gradation dispersion degree DRATE may be determined without using the brightness histogram. For example, a total number of pixels of which gradation values of the input image data ID are substantially the same, in a plurality of pixels in a predetermined image region, is counted, and the gradation dispersion degree DRATE may be determined based on the count result (total number: count value) cnt. In concrete terms, in a case where the count value cnt is small, the lower gradation dispersion degree DRATE may be determined, compared with the case where the count value cnt is large. The phrase "substantially the same" includes "completely the same".

The method for acquiring the count value cnt is not especially limited. For example, a total number of pixels, of which gradation values of the input image data ID are substantially the same as the gradation value of a predetermined pixel of the input image data ID, in a plurality of pixels in the predetermined image region, may be used as the count value cnt. The predetermined pixel may be a pixel in the predetermined image region, or may be a pixel outside the predetermined image region. For example, the predetermined pixel may be a pixel closest to the position of interest. Further, for each one of a plurality of gradation values, a total number of pixels, of which gradation values of the input image data ID are substantially the same as that gradation value (pixels in a predetermined image range), may be detected, so that the maximum value of a plurality of detected total numbers is used as the count value cnt. If this method is used, the gradation dispersion degree DRATE can be determined more accurately compared with the case of counting a number of pixels only for one gradation value.

The offset value determination unit 205 determines, for each of a plurality of directions, the detection sensitivity, which is the detectability of an edge in this direction, based on the gradation dispersion degree DRATE. In this example, an offset value OFST, which is a correction parameter to correct a SAD value (block matching result) acquired by the block matching unit 203, is determined as the detection sensitivity. In concrete terms, 17 offset values OFST (n) for correcting 17 SAD values SAD_ARRAY (n) acquired by the block matching unit 203, are determined. Then the offset value determination unit 205 outputs the offset value OFST (n) to the SAD offset unit 206. For the detection sensitivity, a value that is different from the above mentioned correction parameter, may be determined. For example, "high", "intermediate", "low" and the like may be determined as the detection sensitivity. A correction parameter, for correcting the edge detection result according to the block matching result (SAD value SAD_ARRAY (n)), may be determined as the detection sensitivity.

First, the offset value determination unit 205 determines a detection sensitivity penalty P, which is a first correction parameter, in accordance with the absolute value D of the block distance n (distance between the reference blocks A and B). In concrete terms, the offset value determination unit 205 reads a table PTBL, which indicates the correspondence between the absolute value D and the detection sensitivity penalty P, from a reading unit (not illustrated). Then the offset value determination unit 205 converts the absolute value D into the detection sensitivity penalty P, which is corresponded to the absolute value D in the table PTBL. For example, if the block distance n=−4, then the absolute value D=4 of the block distance n is converted into the detection sensitivity penalty P, which is corresponded to the absolute value D=4 in the table PTBL. The offset value determination unit 205 determines 17 detection sensitivity penalties P (n), which correspond to 17 block distances n.

Figure 7:
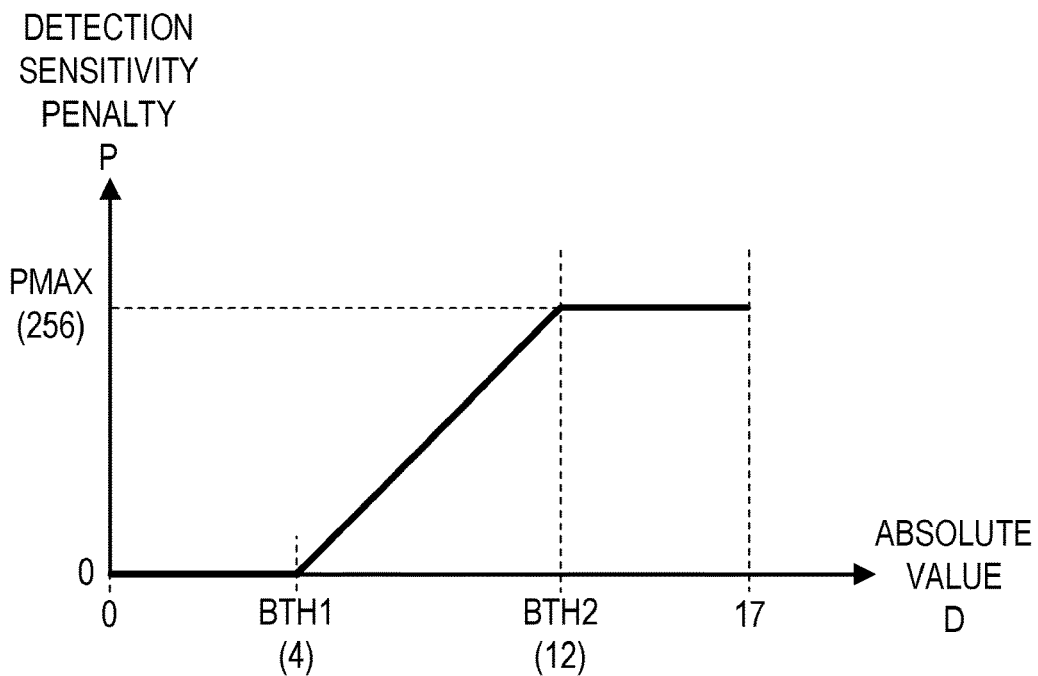
FIG. 7 shows an example of a relationship between block distance and detection sensitivity penalty according to Example 1.

In this example, the table PTBL indicates the correspondence in FIG. 7. According to the correspondence in FIG. 7, in a case where the absolute value D is large, a larger detection sensitivity penalty P is determined, compared with a case where the absolute value D is small. In concrete terms, an absolute value D, which is the threshold BTH1 or less, is converted into the detection sensitivity penalty P=0, and an absolute value D, which is the threshold BTH2 or more, is converted into the detection sensitivity penalty P=PMAX. An absolute value D, which is larger than the threshold BTH1 and smaller than the threshold BTH2, is converted into the detection sensitivity penalty P, so that the detection sensitivity penalty P linearly increases from 0 to PMAX as the absolute value D increases. PMAX is the upper limit value of the detection sensitivity penalty P. In this example in FIG. 7, the threshold BTH1=4, the threshold BTH2=12 and the upper limit value PMAX=256.

The thresholds BTH1 and BTH2 are not especially limited. The threshold BTH1 may be higher or lower than 4, and the threshold BTH2 may be higher or lower than 12. The thresholds BTH1 and BTH2 may be fixed values predetermined by the manufacturer, or may be values which the user can change. The thresholds BTH1 and BTH2 may be values determined by the image processing apparatus in accordance with the operation mode of the image processing apparatus, the type of the input image data ID and the like. The correspondence between the absolute value D and the detection sensitivity penalty P is not limited to the correspondence shown in FIG. 7. For example, the detection sensitivity penalty P may non-linearly increases as the absolute value D increases. The detection sensitivity penalty P need not depend on the absolute value D.

The method of determining the detection sensitivity penalty P is not limited to the above mentioned method. For example, as the information indicating the correspondence between the absolute value D and the detection sensitivity penalty P, a function may be used instead of the table PTBL. Further, the detection sensitivity penalty P may be determined without using the block distance n. For example, the detection sensitivity penalty P may be determined (set) according to the user operation. A fixed value predetermined by the manufacturer may be used as the detection sensitivity penalty P. The detection sensitivity penalty P may be determined by the image processing apparatus in accordance with the operation mode of the image processing apparatus, the type of the input image data ID and the like.

Figure 8:
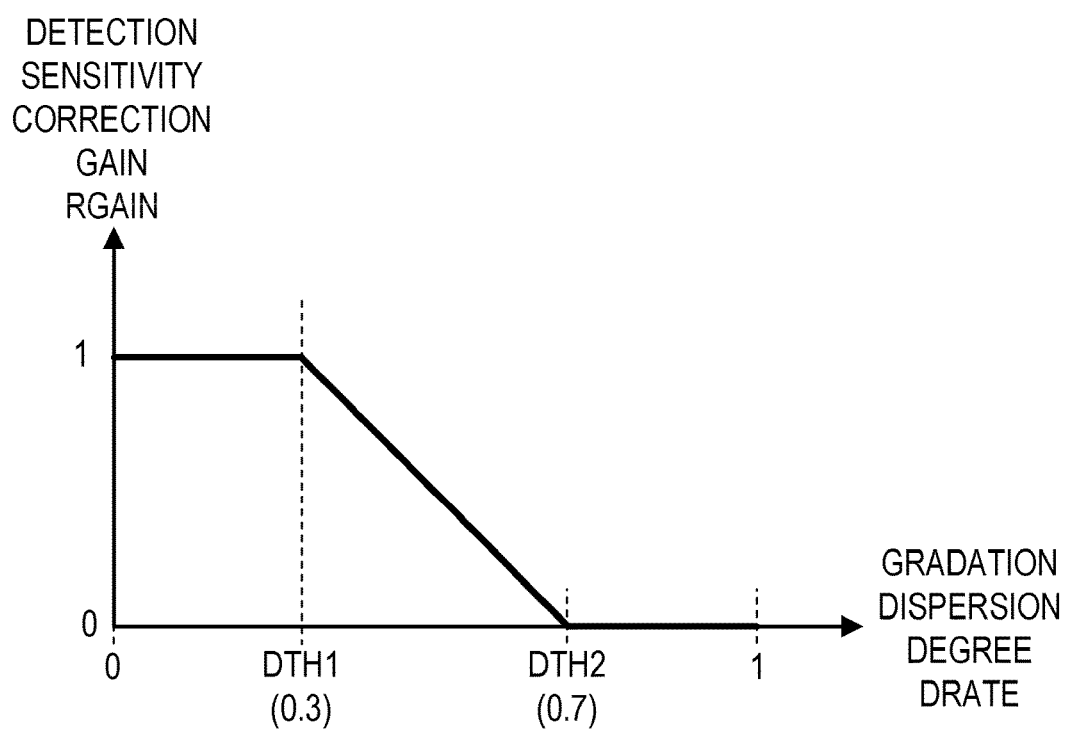
FIG. 8 shows an example of a relationship between gradation dispersion degree and detection sensitivity correction gain according to Example 1.

Then the offset value determination unit 205 determines the detection sensitivity correction gain RGAIN, which is a second correction parameter in accordance with the gradation dispersion degree DRATE. In concrete terms, the offset value determination unit 205 converts the gradation dispersion degree DRATE into the detection sensitivity correction gain RGAIN based on the correspondence shown in FIG. 8. According to the correspondence shown in FIG. 8, in a case where the gradation dispersion degree DRATE is high, a smaller detection sensitivity correction gain RGAIN is determined compared with the case where the gradation dispersion degree DRATE is low. In concrete terms, the gradation dispersion degree DRATE, which is the threshold DTH1 or lower, is converted into the detection sensitivity correction gain RGAIN=1, and the gradation dispersion degree DRATE, that is the threshold DTH2 or higher, is converted into the detection sensitivity correction gain RGAIN=0. The gradation dispersion degree DRATE, which is higher than the threshold DTH1 and lower than the threshold DTH2, is converted into the detection sensitivity correction gain RGAIN so that the detection sensitivity correction gain RGAIN linearly decreases from 1 to 0 as the gradation dispersion degree DRATE increases. In the example of FIG. 8, the threshold DTH1=0.3 and the threshold DTH2=0.7 are set. The offset value determination unit 205 determines one detection sensitivity correction gain RGAIN corresponding to one position of interest. In other words, one detection sensitivity correction gain RGAIN, common to the 17 block distances n, is determined.

The thresholds DTH1 and DTH2 are not especially limited. The threshold DTH1 may be higher or lower than 0.3, and the threshold DTH2 may be higher or lower than 0.7. The thresholds DTH1 and DTH2 may be fixed values predetermined by the manufacturer, or may be values that the user can change. The thresholds DTH1 and DTH2 may be values determined by the image processing apparatus in accordance with the operation mode of the image processing apparatus, the type of the input image data ID and the like. The correspondence between the gradation dispersion degree DRATE and the detection sensitivity correction gain RGAIN is not limited to the correspondence shown in FIG. 8. For example, the detection sensitivity correction gain RGAIN may non-linearly decrease as the gradation dispersion degree DRATE increases.

Then the offset value determination unit 205 determines the offset value OFST in accordance with the detection sensitivity penalty P and the detection sensitivity correction gain RGAIN. In this example, the offset value determination unit 205 calculates the offset value OFST using the following Expression 3. The offset value determination unit 205 determines 17 offset values OFST (n) corresponding to 17 block distances n respectively.

$$OFST(n)=P(n) \times RGAIN \quad \text{(Expression 3)}$$

The first correction parameter and the second correction parameter are not especially limited. For example, the first correction parameter and the second correction parameter may be determined such that the offset value OFST (n) is calculated by adding the first correction parameter to the second correction parameter.

The SAD offset unit 206 corrects the 17 SAD values SAD_ARRAY (n) calculated by the block matching unit 203 using the 17 offset values OFST (n) determined by the offset value determination unit 205. In concrete terms, each corrected SAD value SAD_ARRAY_OFST (n) is calculated by adding the offset value OFST (n) to the SAD value SAD_ARRAY (n), as shown in the following Expression 4. Then the SAD offset unit 206 outputs the SAD value SAD_ARRAY_OFST (n) to the matching angle determination unit 207.

$$SAD\_ARRAY\_OFST(n)=SAD\_ARRAY(n)+OFST(n) \quad \text{(Expression 4)}$$

In this example described above, the offset value to be added to the SAD value is determined as a correction parameter to correct the SAD value, but the correction parameter is not limited to this. For example, a gain value, by which the SAD value is multiplied, may be determined as the correction parameter to correct the SAD value.

Figure 9:
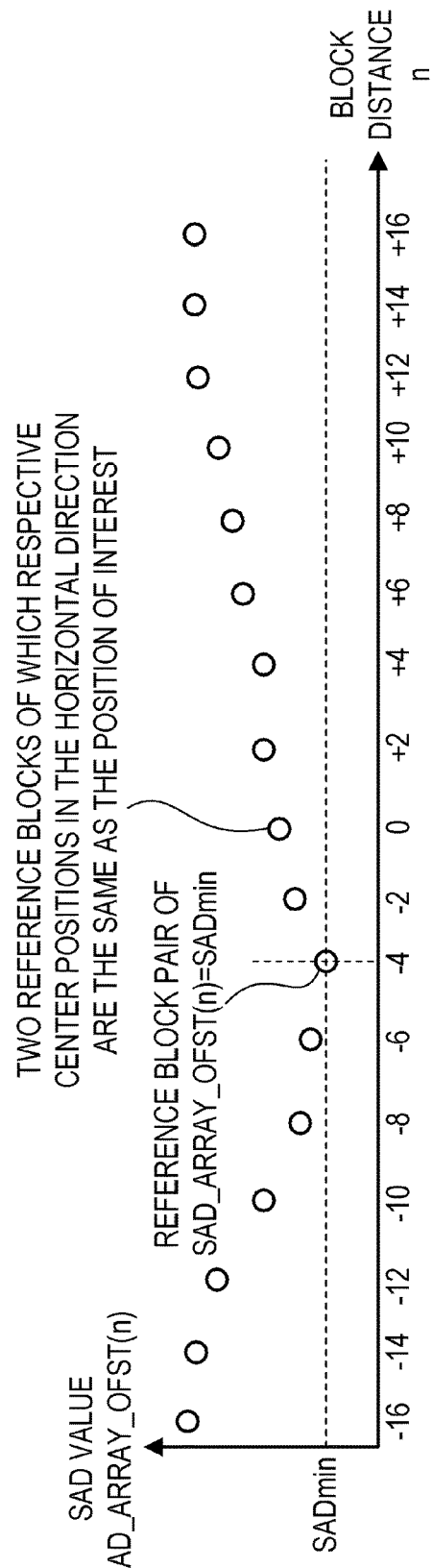
FIG. 9 shows an example of distribution of SAD values after correction according to Example 1.

The matching angle determination unit 207 detects an edge in the input image at the detection sensitivity determined by the offset value determination unit 205. In concrete terms, the matching angle determination unit 207 determines the angle information ANGLE in accordance with the minimum value SADmin of the 17 SAD_ARRAY_OFST (n) output from the SAD offset unit 206. Then the matching angle determination unit 207 outputs the determined angle information ANGLE to the scaler unit 102. In concrete terms, the matching angle determination unit 207 determines n of SADmin of SAD_ARRAY_OFST (n) as the angle information ANGLE. For example, if the distribution of SAD_ARRAY_OFST (n) is the distribution shown in FIG. 9, the angle information ANGLE=−4 is acquired.

As mentioned above, the positional relationship of the reference blocks A and B in FIGS. 3A and 3B corresponds to the candidate of the edge direction (candidate direction). This means that "the block distance n corresponds to the candidate direction". In concrete terms, the block distance n having a positive value corresponds to the candidate direction that is upward to the right, and the block distance n having a negative value corresponds to the candidate direction that is downward to the right. And as the absolute value of the block distance n is larger, the block distance n corresponds to the candidate direction that is closer to the horizontal direction, and as the absolute value of the block distance n is smaller, the block distance n corresponds to the candidate direction that is more distant from the horizontal direction (closer to the vertical direction).

In this example, the angle information ANGLE is determined based on the corrected SAD value SAD_ARRAY_OFST (n). This means that the processing to determine the offset value OFST is "processing to determine the detection sensitivity". And the processing to determine the angle information ANGLE based on the corrected SAD value SAD_ARRAY_OFST (n) is "processing to detect an edge at the determined detection sensitivity".

In this example, an edge in the direction corresponding to the block distance n (candidate direction) can more likely be detected as the SAD value SAD_ARRAY_OFST (n) is smaller. And an edge in the direction corresponding to the block distance n is less likely to be detected as the SAD value SAD_ARRAY_OFST (n) is larger. As shown in Expression 4, the SAD value SAD_ARRAY_OFST (n) is calculated by adding the offset value OFST (n) to the SAD value SAD_ARRAY (n). Therefore the edge detection sensitivity in the direction corresponding to the block distance n is decreased more as the offset value OFST (n) is larger.

As shown in Expression 3, if the detection sensitivity penalty P (n) is constant, a larger value is acquired as the offset value OFST (n) as the detection sensitivity correction gain RGAIN is larger. In a case where the gradation dispersion degree DRATE is low, as shown in FIG. 8, the higher detection sensitivity correction gain RGAIN is acquired, compared with the case where the gradation dispersion degree DRATE is high. Therefore in a case where the gradation dispersion DRATE is low, a larger offset value OFST (n) is acquired, compared with the case where the gradation dispersion degree DRATE is high. In other words, in a case where the gradation dispersion degree DRATE is low, a lower detection sensitivity is determined, compared with the case where the gradation dispersion degree DRATE is high.

As shown in Expression 3, if the detection sensitivity correction gain RGAIN is constant, a larger offset value OFST (n) is acquired as the detection sensitivity penalty P (n) is larger. Further, as shown in FIG. 7, in a case where the absolute value D is large, a larger detection sensitivity penalty P (n) is acquired, compared with the case where the absolute value D is small. The absolute value D is a distance between the reference block A and the reference block B in FIGS. 3A and 3B in the horizontal direction. Therefore as the absolute value D is larger, the candidate direction (direction of the broken line arrows in FIGS. 3A and 3B; candidate of the edge direction) is closer to the horizontal direction. This means that in a case where the candidate direction is close to the horizontal direction, a larger detection sensitivity penalty P (n) is acquired, compared with the case where the candidate direction is distant from the horizontal direction. As a result, if the candidate direction is closer to the horizontal direction, a larger offset value OFST (n) is acquired, compared with the case where the candidate direction is distant from the horizontal direction. In other words, in a case where the candidate direction is close to the horizontal direction, a lower detection sensitivity is determined, compared with the case where the candidate direction is distant from the horizontal direction.

Therefore according to this example, in a case where the gradation dispersion degree DRATE is low, a lower detection sensitivity is determined as the edge detection sensitivity in the direction close to the horizontal direction, compared with the edge detection sensitivity distant from the horizontal direction. In a case where the gradation dispersion degree DRATE is high, substantially the same detection sensitivity is determined in a plurality of edge directions.

In the image region of the text image, an edge in the direction close to the horizontal direction may be detected by mistake, even if an edge exists in the direction distant from the horizontal direction. Therefore in the image region of the text image, it is preferable that the edge detection sensitivity in the direction close to the horizontal direction is controlled to be a lower detection sensitivity, compared with the edge detection sensitivity in the direction distant from the horizontal direction. In the image region of a natural image, it is rare for an edge in the direction close to the horizontal direction to be detected by mistake in a case where an edge in the direction distant from the horizontal direction exists. Therefore in an image region of a natural image, it is preferable that the edge detection sensitivity is controlled to be substantially the same detection sensitivity in a plurality of edge directions. Normally a low value is acquired for the gradation dispersion degree DRATE in an image region of a text image, and a high value is acquired for the gradation dispersion degree DRATE in an image region of a natural image. Therefore according to this example, the above mentioned desirable control can be implemented, and an edge can be detected at high precision.

Figure 6:
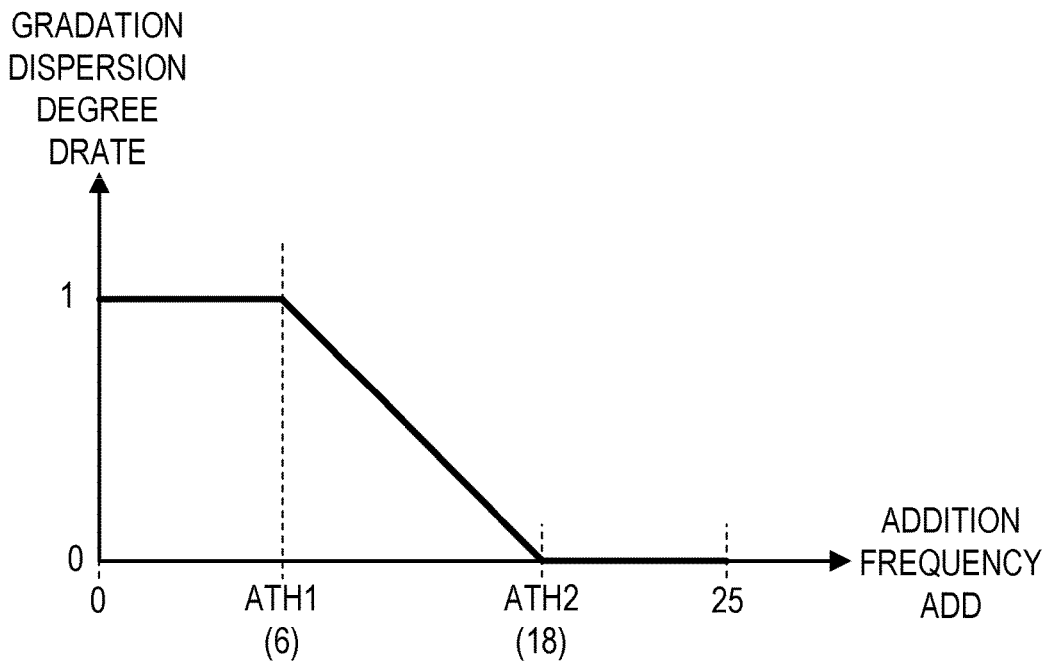
FIG. 6 shows an example of a relationship between addition frequency and gradation dispersion degree according to Example 1.

The detection sensitivity can be adjusted by adjusting the thresholds ATH1 and ATH2 in FIG. 6, the upper limit value PMAX in FIG. 7, the thresholds BTH1 and BTH2 in FIG. 7, the thresholds DTH1 and DTH2 in FIG. 8 and the like (tuning the detection sensitivity). For example, if the thresholds ATH1 and ATH2 are adjusted so as to decrease the gradation dispersion degree DRATE, the detection sensitivity is decreased. If the upper limit value PMAX is increased, the detection sensitivity is decreased. If the thresholds BTH1 and BTH2 are adjusted so as to increase the detection sensitivity penalty P, the detection sensitivity is decreased. If the thresholds DTH1 and DTH2 are adjusted so as to increase the detection sensitivity correction gain RGAIN, the detection sensitivity is decreased.

Figure 10:
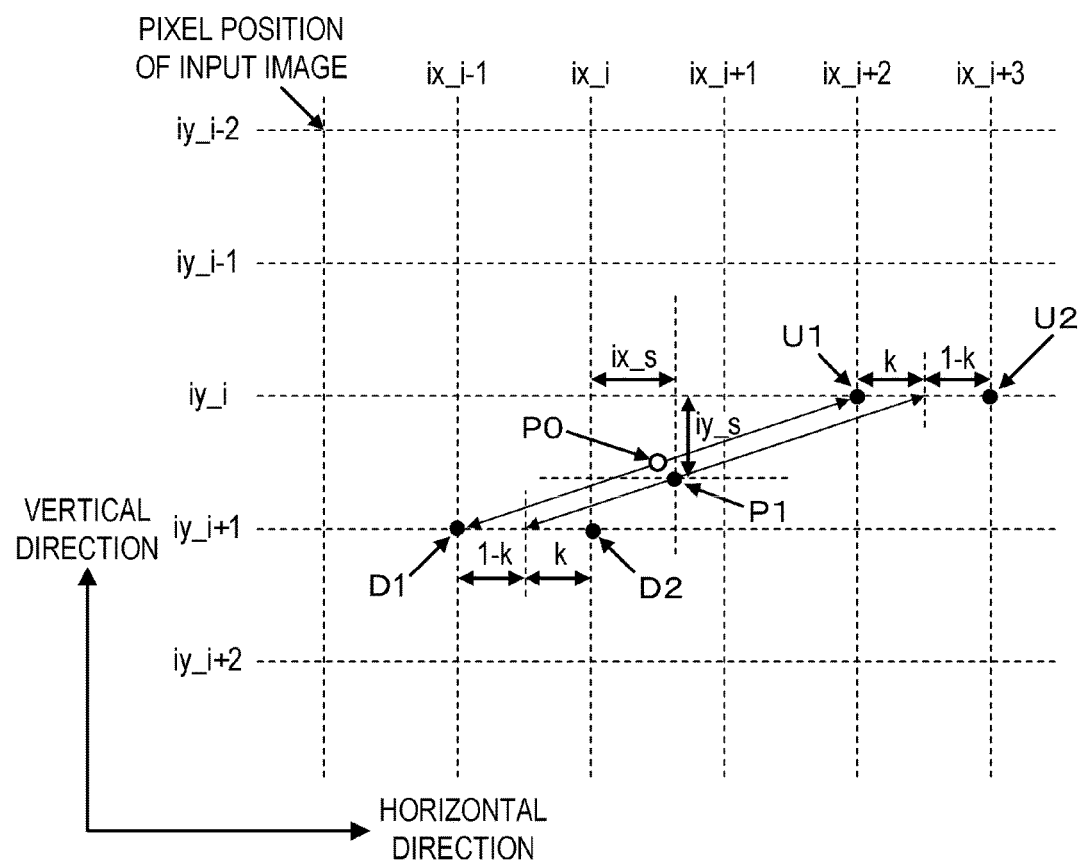
FIG. 10 shows an example of scaler processing according to Example 1.

Now the scaler unit 102 will be described in detail. FIG. 10 shows an example of the scaler processing performed by the scaler unit 102. In the scaler processing, an interpolation pixel (SC interpolation pixel) is generated in the input image, in a position where a pixel does not exist. In FIG. 10, "P0" indicates the position of interest, and "P1" indicates the SC interpolation position (position where the SC interpolation pixel is generated). The position of interest is not especially limited, but in this example, a center position of 4 pixels (2 rows×2 columns) of the input image data ID is used as the position of interest, as shown in FIG. 10. The position of interest P0 is a position of interest closest to the SC interpolation position P1. The SC interpolation position P1 depends on the enlargement ratio or the reduction ratio of the scaler processing. In FIG. 10, "ix_i" is an integer value to indicate a horizontal position of a pixel of the input image data ID, and "iy_i" is an integer value to indicate a vertical position (position in the vertical direction) of a pixel of the input image data ID. "ix_s" is a fractional value to indicate the horizontal position of the SC interpolation position P1, and "iy_s" is a fractional value to indicate the vertical position of the SC interpolation position P1. The coordinates of the SC interpolation position P1 (horizontal position, vertical position) can be expressed by (ix_i+ix_s, iy_i+iy_s).

According to this example, in the scaler processing, 4 pixels U1, U2, D1 and D2 of the input image data ID are selected based on the angle information ANGLE. Then using the pixel values of the selected 4 pixels U1, U2, D1 and D2, the pixel value DOUT of the SC interpolation position P1 is calculated. Then the calculated pixel value DOUT is output as the pixel value of the image data OD.

The pixels U1 and U2 are pixels on one line above the SC interpolation position P1, and the pixels D1 and D2 are pixels on one line below the SC interpolation position P1. In this example, values that indicate the horizontal positions of the pixels U and D, with respect to the position of interest, are used as the angle information ANGLE. In this example, the pixels U1 and D1 are selected based on the angle information ANGLE. The pixels U1 and D1 are pixels adjacent to the position of interest P0 in the edge direction indicated by the angle information ANGLE. By shifting the horizontal positions of the pixels U1 and D1 toward the SC interpolation position P1 by only one pixel, pixels U2 and D2 are selected. The horizontal positions U1(x), U2(x), D1(x) and D2(x) of the pixels U1, U2, D1 and D2 can be calculated using the following Expression 5. In Expression 5, "INT(X)" is a function to acquire the integer portion of X.

$U1(x)=\text{INT}(ix\_i+ix\_s+\text{ANGLE\_SC}\times iy\_s)$ $U2(x)=U1(x)+1$ $D1(x)=U1(x)-\text{ANGLE\_SC}$ $D2(x)=D1(x)+1$ (Expression 5)

"k" in FIG. 10 is a parameter that is used for calculating a pixel value of the SC interpolation position P1, and is a parameter to determine a weight of the pixel value of each of the pixels U1, U2, D1 and D2. As shown in FIG. 10, the parameter k is a distance between a first position and the pixel U1. The first position is a position on one line above the SC interpolation position P1, and is a position adjacent to the SC interpolation position P1 in the edge direction indicated by the angle information ANGLE. The parameter k is also a distance between a second position and the pixel D2. The second position is a position on one line below the SC interpolation position P1, and is a position adjacent to the SC interpolation P1 in the edge direction indicated by the angle information ANGLE. The parameter k is calculated using the following Expression 6.

$$k = (ix\_s + \text{ANGLE\_SC} \times iy\_s) - \text{INT}(ix\_s + \text{ANGLE\_SC} \times iy\_s)$$ (Expression 6)

By weighting and combining each pixel value of the pixels U1, U2, D1 and D2 using a weight based on the parameter k (weight based on the distance from the SC interpolation position P1), the pixel value DOUT of the SC interpolation position P1 is calculated. In concrete terms, the pixel value DOUT is calculated using the following Expression 7. In Expression 7, "PD(U1(x), iy_i)" is a pixel value of the pixel U1, "PD(U2(x), iy_i)" is a pixel value of the pixel U2, "PD(D1(x), iy_i+1)" is a pixel value of the pixel D1, and "PD(D2(x), iy_i+1)" is a pixel value of the pixel D2.

$$DOUT = \quad \text{(Expression 7)}$$
$$(PD\,(U1\,(x),\,iy\_i) \times (1-k) + PD\,(U2\,(x),\,iy\_i) \times k) \times$$
$$(1-iy\_s) + (PD\,(D1\,(x),\,iy\_i+1) \times k +$$
$$PD\,(D2\,(x),\,iy\_i+1) \times (1-k)) \times iy\_s$$

According to Expression 7, "1−k" (the distance between the first position and the pixel U2) is used as a weight of the pixel value PD (U1(x), iy_i), and "k" (distance between the first pixel and the pixel U1) is used as a weight of the pixel value PD (U2(x), iy_i). Using these weights, the pixel value PD (U1(x), iy_i) and the pixel value PD (U2(x), iy_i) are weighted and combined, whereby a first composite value is calculated.

Further, "k" (the distance between the second position and the pixel D2) is used as a weight of the pixel value PD (D1(x), iy_i+1), and "1−k" (the distance between the second pixel and the pixel D1) is used as a weight of the pixel value PD (D2(x), iy_i+1). Using these weights, the pixel value PD (D1(x), iy_i+1) and the pixel value PD (D2(x), iy_i+1) are weighted and combined, whereby a second composite value is calculated.

Then "1−iy_s" (the vertical distance (the distance in the vertical direction) between the line connecting the pixels D1 and D2 and the SC interpolation position P1) is used as a weight of the first composite value. Further, "iy_s" (the vertical distance between the line connecting the pixels U1 and U2 and the SC interpolation position P1) is used as a weight of the second composite value. Using these weights, the first composite value and the second composite value are weighted and combined, whereby the pixel value DOUT is calculated.

As described above, according to this example, for each one of a plurality of directions, the detection sensitivity, which is the edge detectability in this direction, is determined based on the dispersion degree of the gradation values of the input image data. Then an edge is detected in the input image at the determined detection sensitivity. Thereby the edge can be detected at higher precision. For example, a diagonal line with a shallow angle (close to the horizontal line) included in a natural image, a diagonal line included in text and the like can be detected at high precision. As a result, various processing based on the edge detection result can be performed at higher precision. For example, the generation of jaggies, caused by scaler processing, can be suppressed at higher precision.

Example 2

Example 2 of the present invention will now be described. In Example 1, a case of correcting the SAD value, which is the block matching result, was described. In Example 2, a case of correcting the edge detection result, in accordance with the block matching result, will be described. In the following, the configuration and processing which are different from Example 1 will be described in detail, and description on the configuration and processing which are the same as Example 1 will be omitted.

Figure 11:
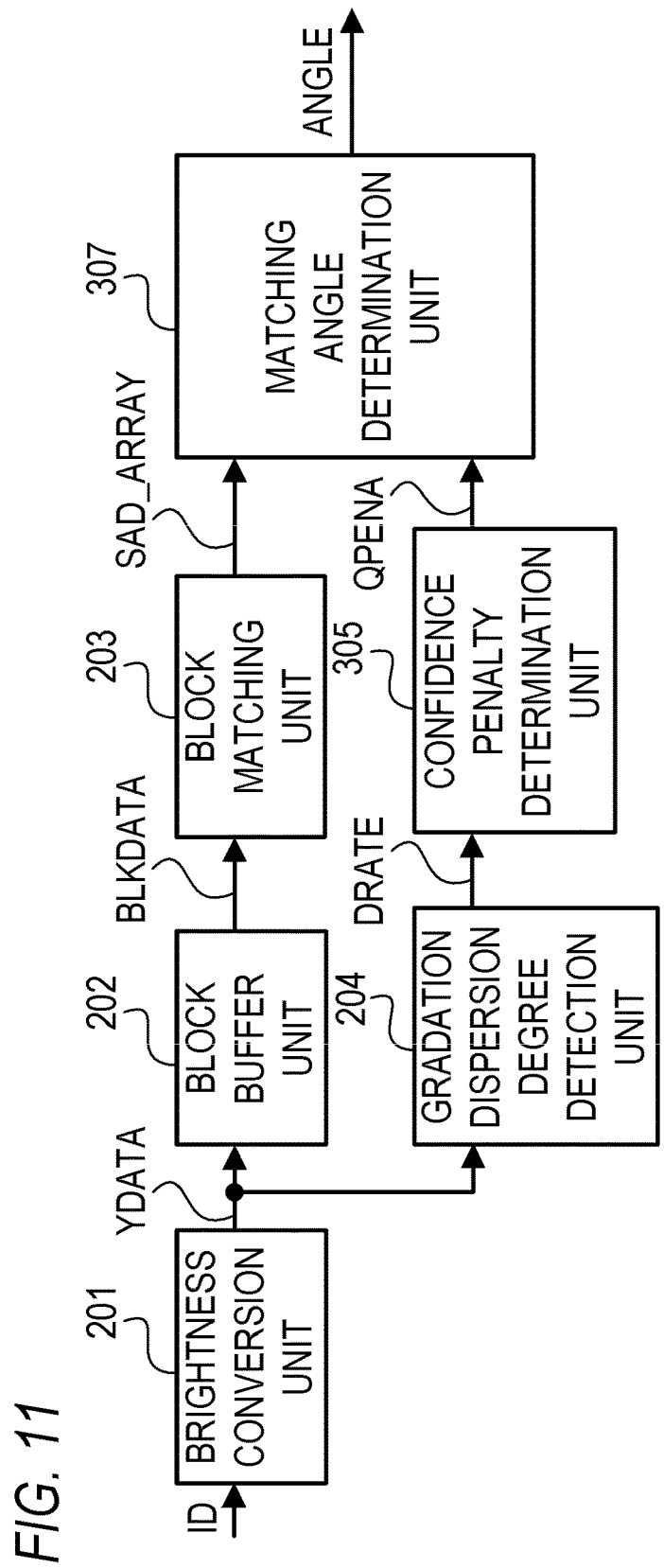
FIG. 11 is a block diagram depicting an example of a configuration of an edge detection unit according to Example 2.

The configuration of the image processing apparatus according to this example is the same as that of Example 1 (FIG. 1). In this example, however, the processing by the edge detection unit 101 is different from Example 1. FIG. 11 is a block diagram depicting an example of the configuration of the edge detection unit 101 according to this example. In FIG. 11, a function unit the same as Example 1 is denoted with a same reference sign as Example 1, and the redundant description on the functional unit will be omitted.

A confidence penalty determination unit 305 determines confidence penalty QPENA based on the gradation dispersion degree DRATE output from the gradation dispersion degree detection unit 204. Then the confidence penalty determination unit 305 outputs the determined confidence penalty QPENA to a matching angle determination unit 307. The confidence penalty QPENA is a correction parameter to correct the angle information ANGLE in accordance with the block matching result (SAD value SAD_ARRAY (n)). The confidence penalty QPENA can be regarded as a "non-confidence of the angle information ANGLE in accordance with the SAD value SAD_ARRAY (n)".

Figure 12:
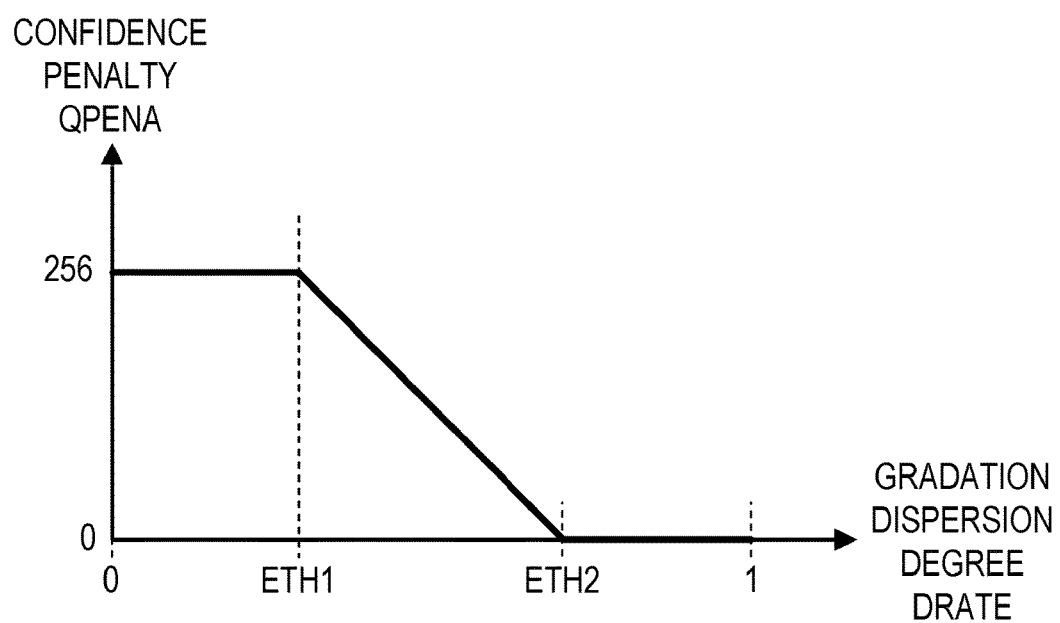
FIG. 12 shows an example of a relationship between gradation dispersion degree and confidence penalty according to Example 2.

In this example, the confidence penalty determination unit 305 converts the gradation dispersion degree DRATE into the confidence penalty QPENA based on the correspondence shown in FIG. 12. According to the correspondence shown in FIG. 12, in a case where the gradation dispersion degree DRATE is high, a lower confidence penalty QPENA is determined, compared with the case where the gradation dispersion degree DRATE is low. In concrete terms, a gradation dispersion degree DRATE, which is a threshold ETH1 or lower, is converted into the confidence penalty QPENA, and a gradation dispersion degree DRATE, which is a threshold ETH2 or higher, is converted into the confidence penalty QPENA=0. A gradation dispersion DRATE which is higher than the threshold ETH1 and lower than the threshold ETH2 is converted into the confidence penalty QPENA, so that the confidence penalty QPENA linearly decreases from 1 to 0 as the gradation dispersion degree DRATE increases. The confidence penalty determination unit 305 determines one confidence penalty QPENA corresponding to one position of interest.

As described in Example 1, in an image region of a text image, an edge in a direction close to the horizontal direction may be detected by mistake in a case where an edge in a direction distant from the horizontal direction exists. Therefore in a case where the gradation dispersion degree DRATE is low, the confidence in the angle information ANGLE in accordance with the SAD value SAD_ARRAY (n) is lower, compared with the case where the gradation dispersion degree DRATE is high. This is the reason why the gradation dispersion degree DRATE is converted into the confidence penalty QPENA according to the correspondence shown in FIG. 12.

The thresholds ETH1 and ETH2 are not especially limited. The thresholds ETH1 and ETH2 may be fixed values predetermined by the manufacturer, or may be values that the user may change. The thresholds ETH1 and ETH2 may also be values determined by the image processing apparatus in accordance with the operation mode of the image processing apparatus, the type of the input image data ID and the like. The correspondence between the gradation dispersion degree DRATE and the confidence penalty QPENA is not limited to the correspondence shown in FIG. 12. For example, the confidence penalty QPENA may non-linearly decrease as the gradation dispersion degree DRATE increases.

The matching angle determination unit 307 determines the angle information ANGLE based on the minimum value SADmin of 17 values of SAD_ARRAY (n) output from the block matching unit 203, and the confidence penalty QPENA output from the confidence penalty determination unit 305. In concrete terms, the matching angle determination unit 307 determines the angle information ANGLE in accordance with the minimum value SADmin of the 17 values of SAD_ARRAY (n) output from the block matching unit 203. Here n of SAD_ARRAY (n) of SADmin is determined as the angle information ANGLE. Then the matching angle determination unit 307 corrects the angle information ANGLE in accordance with the confidence penalty QPENA output from the confidence penalty determination unit 305.

Therefore in this example, the angle information ANGLE is determined based on the SAD value SAD_ARRAY (n) and the confidence penalty QPENA. Therefore the processing to determine the confidence penalty QPENA can be regarded as "processing to determine the detection sensitivity". The processing to determine the angle information ANGLE based on the SAD value SAD_ARRAY (n) and the confidence penalty QPENA can be regarded as "processing to detect an edge at the determination detection sensitivity".

In this example, the angle information ANGLE is corrected as follows in accordance with the comparison result between the confidence penalty QPENA and the threshold QTH. The threshold QTH is not especially limited. The threshold QTH may be a fixed value predetermined by the manufacturer, or may be a value which the user can change. The threshold QTH may also be a value determined by the image processing apparatus in accordance with the operation mode of the image processing apparatus, the type of input image data ID and the like.

In the case of QPENA>QTH:
the angle information ANGLE is corrected to angle information ANGLE=0.

In the case of QPENA≤QTH:
the angle information ANGLE is not corrected.

As described above, in this example, in a case where the confidence penalty QPENA is high, it is determined that the confidence in the angle information ANGLE in accordance with the SAD value SAD_ARRAY (n) is low, and the angle information ANGLE is corrected to 0. The angle information ANGLE=0 indicates that an edge in the vertical direction exists, and no edge exists. In a case where the confidence penalty QPENA is low, it is determined that the confidence in the angle information ANGLE in accordance with the SAD value SAD_ARRAY (n) is high, and the angle information ANGLE is not corrected.

As shown in FIG. 12, in a case where the gradation dispersion degree DRATE is low, a higher confidence penalty QPENA is acquired, compared with the case where the gradation dispersion degree DRATE is high. Therefore the processing to determine the confidence penalty QPENA can be regarded as "processing to determine a lower detection sensitivity in a case where the gradation dispersion degree DRATE is low, compared with the case where the gradation dispersion degree DRATE is high". The processing to determine the confidence penalty QPENA can also be regarded as "processing to determine a lower detection sensitivity for an edge in a direction close to the horizontal direction in a case where the gradation dispersion degree DRATE is low, compared with the detection sensitivity for an edge in a direction distant from the horizontal direction". The processing to determine the confidence penalty QPENA can also be regarded as "processing to determine substantially the same detection sensitivity for a plurality of edge directions in a case where the gradation dispersion degree DRATE is high".

As described above, according to this example, a correction parameter to correct the edge detection result is determined based on the gradation dispersion degree. Then the edge detection result is corrected using the determined correction parameter. Thereby an edge can be detected at higher precision.

In this example, the case of using one value "0" as the corrected angle information ANGLE was described, but the present invention is not limited to this. For example, the angle information ANGLE may approach 0 using a larger correction amount (change amount) as the confidence penalty QPENA is higher.

In this example, the case of correcting the angle information ANGLE in accordance with the confidence penalty QPENA was described, but the minimum value SADmin may be corrected in accordance with the confidence penalty QPENA. For example, a correction may be performed by adding the confidence penalty QPENA to the minimum value SADmin. As the minimum value SADmin is larger, the confidence in the angle information ANGLE in accordance with the minimum value SADmin is lower. Therefore the correction to add the confidence penalty QPENA to the minimum value SADmin can be regarded as a "correction to decrease confidence in the angle information ANGLE". The angle information ANGLE may be corrected in accordance with the comparison result between the corrected SADmin and the threshold. The interpolation method used by the scaler unit 102 (method for determining the pixel value DOUT) may be changed in accordance with the corrected confidence (e.g. corrected SAD value). For example, the pixel value DOUT is determined using the method according to Example 1 in a case where the confidence is high, and the pixel value DOUT is determined using 4 pixels closest to the SC interpolation position in a case where the confidence is low.

Example 3

Example 3 of the present invention will now be described. In Example 1, the case where the size of the image region, for which the gradation dispersion degree is detected, is fixed, was described. In this example, the size of the image region, for which the gradation dispersion degree is detected, is determined in accordance with the size of the reference range which is used for the block matching. In the following, the configuration and processing which are different from Example 1 will be described in detail, and description on the configuration and processing which are the same as Example 1 will be omitted.

Figure 13:
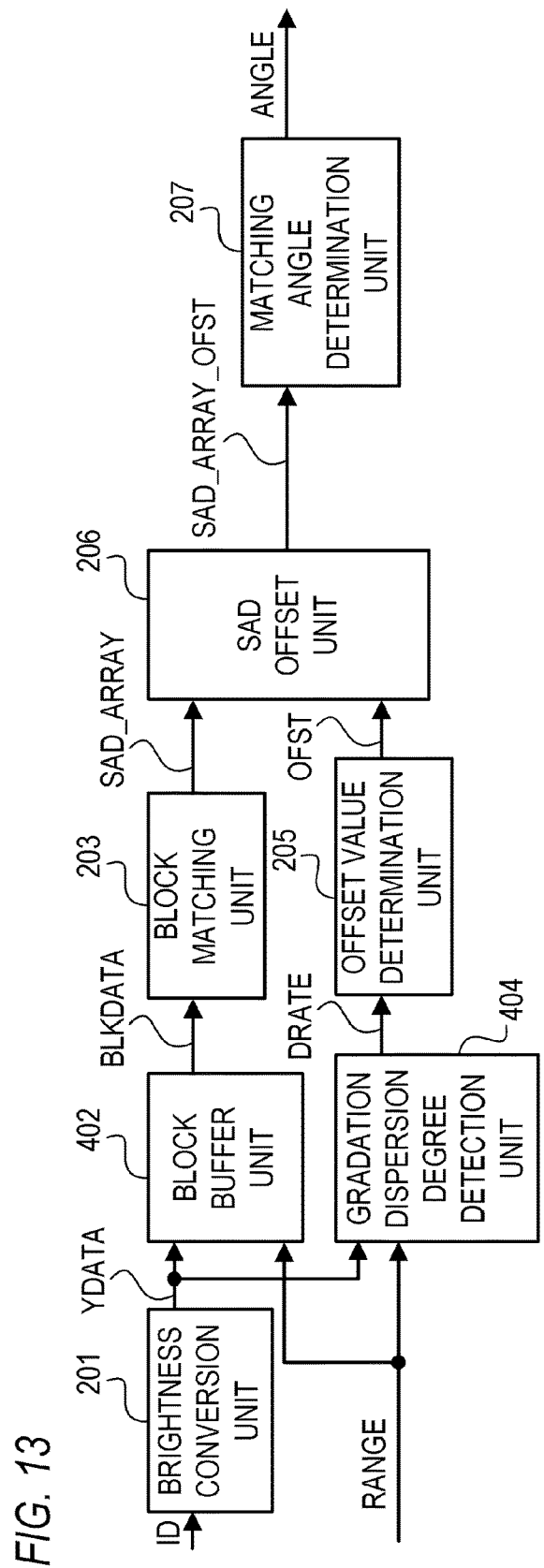
FIG. 13 is a block diagram depicting an example of a configuration of an edge detection unit according to Example 3.

The configuration of the image processing apparatus according to this example is the same as that of Example 1 (FIG. 1). In this example, however, the processing by the edge detection unit 101 is different from Example 1. FIG. 13 is a block diagram depicting an example of the configuration of the edge detection unit 101 according to this example. In FIG. 13, a functional unit the same as Example 1 is denoted with a same reference sign as Example 1, and redundant description on this functional unit will be omitted.

A block buffer unit 402 performs the same processing as the block buffer unit 202 in Example 1. In Example 3, the block buffer unit 402 changes the size of the image region of the block data BLKDATA. In concrete terms, the range information RANGE, to indicate the size of the reference range, is input to the image processing apparatus. The block buffer unit 402 sets an image region having the size indicated in the range information RANGE as a reference region, and outputs the data on the reference region as the block data BLKDATA. The size of the reference range can be changed by changing the range information RANGE.

The gradation dispersion degree detection unit 404 determines the gradation dispersion degree DRATE by a same method as the gradation dispersion degree detection unit 204 of Example 1. In this example however, the gradation dispersion degree detection unit 404 changes the size of the image region for which the gradation dispersion degree DRATE is detected (dispersion detection region). In concrete terms, in a case where the size of the reference range is large, the gradation dispersion degree detection unit 404 sets a larger image region as the dispersion detection region, compared with the case where the size of the reference range is small. As a result, in a case where the size of the reference range is large, a higher dispersion degree of the gradation values in the image region is detected as the gradation dispersion degree DRATE, compared with the case where the size of the reference range is small.

In a case where the resolution of the input image data ID is low, an edge may be detected by mistake if the position of the reference block is changed over a wide range. Hence in this example, in a case where the resolution of the input image data ID is low, information to indicate the size of the reference range that is smaller than the size of the reference range used in a case where the resolution of the input image data ID is high, is used as the range information RANGE. Thereby a suitable reference range in accordance with the resolution of the input image data ID can be set. As a result, edge detection errors are suppressed, and edge detection at higher precision can be implemented.

By using the above mentioned range information RANGE, a smaller dispersion detection range is set in a case where the resolution of the input image data ID is low, compared with the case where the resolution of the input image data ID is high. Thereby, a suitable dispersion detection region, in accordance with the size of the reference range, can be set. As a result, a more suitable gradation dispersion degree DRATE can be acquired, and edge detection at higher precision can be implemented.

The range information RANGE is a value calculated using the following Expression 8, for example. In Expression 8, "HRESO" denotes a horizontal resolution (a number of pixels in the horizontal direction) of the input image data ID, and is 1920, for example. "VRESO" denotes a vertical resolution (a number of pixels in the vertical direction; a number of lines in the vertical direction) of the input image data ID, and is 1080, for example. "α" denotes a predetermined coefficient, and is an arbitrary value that is 0 or more 1 or less, for example.

$$RESO=(HRESO \times VRESO) \times \alpha \quad \text{(Expression 8)}$$

A size unrelated to the resolution of the input image data ID may be used as the size of the reference range. For example, a size selected by the user may be used as the size of the reference range. The size of the reference range may be determined without using information from the outside (from range information RANGE). For example, processing to detect the resolution of the input image data ID, processing to determine the size of the reference range in accordance with the resolution detection result and the like may be executed within the image processing apparatus.

In this example, the correspondence between the range information RANGE and the size of the dispersion detection region is predetermined. For example, information to indicate the correspondence (table or function), as shown in FIG. 14, is recorded in memory (not illustrated) in advance. The gradation dispersion degree detection unit 404 determines the size of the dispersion detection region based on this predetermined correspondence and the acquired range information RANGE. In the example of FIG. 14, the size of the dispersion detection region=3 (a number of pixels in the horizontal direction)×3 (a number of lines in the vertical direction) corresponds to the range information RANGE_A, and the size=5×5 corresponds to the range information RANGE_B. The size=7×7 corresponds to the range information RANGE_C, and the size=9×9 corresponds to the range information RANGE_D. In FIG. 14, the size indicated by the range information RANGE_A (reference range)<the size indicated by the range information RANGE_B<the size indicated by the range information RANGE_C<the size indicated by the range information RANGE_D. If the range information RANGE_A is acquired, a dispersion detection region having size=3×3 is set. If the range information RANGE_B, RANGE_C or RANGE_D is acquired, a dispersion detection region having size=5×5, 7×7 or 9×9 is set respectively.

As described above, according to this example, the size of the dispersion detection region is changed in accordance with the size of the reference range. Thereby, the calculation accuracy of the gradation dispersion degree can be improved, and edge detection at higher precision can be implemented.

Examples 1 to 3 are merely examples, and the configurations acquired by appropriately modifying or changing the configurations of Examples 1 to 3, within a scope of the spirit of the present invention, are also included in the present invention. Configurations acquired by appropriately combining the configurations of Examples 1 to 3 are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-248321, filed on Dec. 21, 2015, which is hereby incorporated by reference herein in its entirety.

What is claimed is:

1. An edge detection apparatus, comprising:
a detection unit configured to detect a dispersion degree of gradation values of input image data whose resolution is lower than an output resolution;
a determination unit configured to determine detection sensitivity, which is edge detectability, based on the dispersion degree detected by the detection unit;
an edge detection unit configured to detect an edge from an input image based on the input image data, at the detection sensitivity determined by the determination unit; and
a scaling unit configured to output image data generated by converting the input image data to the output resolution in accordance with the detected edge, wherein
with respect to first and second cases in which the dispersion degree is lower in the first case than the dispersion degree in the second case, the determination unit determines a detection sensitivity that is lower in the first case and higher in the second case.

2. The edge detection apparatus according to claim 1, wherein
the determination unit determines, for each of a plurality of directions, a detection sensitivity which is an edge detectability in the direction, based on the dispersion degree detected by the detection unit.

3. The edge detection apparatus according to claim 2, wherein
with respect to the first case in which the dispersion degree is lower than that of the second case, the determination unit determines a lower detection sensitivity as the detection sensitivity of an edge which exists in a direction closer to a horizontal direction, compared with the detection sensitivity of an edge which exists in a direction farther from the horizontal direction.

4. The edge detection apparatus according to claim 1, wherein
in a case where a sum of frequencies of N number of categories (N is 2 or greater integer) in order from a category of which frequency is the highest, in a plurality of categories of a histogram of the gradation values of the input image data, is larger, the detection unit determines a lower dispersion degree, compared with a case where the sum is smaller.

5. The edge detection apparatus according to claim 1, wherein
in a case where a total number of categories of which frequencies are higher than a threshold, in a plurality of categories of a histogram of the gradation values of the input image data, is smaller, the detection unit determines a lower dispersion degree, compared with a case where the total number is larger.

6. The edge detection apparatus according to claim 1, wherein
in a case where a total number of pixels, of which gradation values of the input image data are substantially the same, is smaller, the detection unit determines a lower dispersion degree, compared with a case where the total number is larger.

7. The edge detection apparatus according to claim 6, wherein
the detection unit determines the dispersion degree based on a total number of pixels, of which gradation values of the input image data are substantially the same as a gradation value of the input image data of a predetermined pixel.

8. The edge detection apparatus according to claim 6, wherein
the detection unit detects, for each of a plurality of gradation values, a total number of pixels of which gradation values of the input image data are substantially the same as that gradation value, and
determines the dispersion degree based on the maximum value of the plurality of detected total numbers.

9. The edge detection apparatus according to claim 1, wherein
the edge detection unit detects an edge based on a result of block matching which compares input images in two reference blocks while changing the positions of the two reference blocks.

10. The edge detection apparatus according to claim 9, wherein
the determination unit determines, as the detection sensitivity, a correction parameter to correct the result of the block matching.

11. The edge detection apparatus according to claim 10, wherein
the determination unit
determines a first correction parameter in accordance with the distance between the two reference blocks,
determines a second correction parameter in accordance with the dispersion degree, and
determines the correction parameter to correct the result of the block matching in accordance with the first correction parameter and the second correction parameter.

12. The edge detection apparatus according to claim 9, wherein
the determination unit determines, as the detection sensitivity, a correction parameter to correct the detection result of the edge in accordance with the result of the block matching.

13. The edge detection apparatus according to claim 1, wherein
the detection unit detects the dispersion degree of gradation values in a predetermined image region.

14. The edge detection apparatus according to claim 1, wherein
the edge detection unit detects an edge based on a result of block matching which compares input images in two reference blocks while changing the positions of the two reference blocks within a reference range,
the size of the reference range is changeable, and
with respect to third and fourth cases in which the size of the reference range is larger in the third case as compared with the size of the reference range in the fourth case, the detection unit detects a dispersion degree of gradation values in an image region which is larger in the third case as compared with an image region in the fourth case.

15. The edge detection apparatus according to claim 14, wherein
with respect to fifth and sixth cases in which the resolution of the input image data is lower in the fifth case than the resolution of the input image data in the sixth case, the size of the reference range is smaller in the fifth case as compared with the size of the reference range in the sixth case.

16. The edge detection apparatus according to claim 1, further comprising a conversion unit configured to convert the resolution of the input image data based on a detection result by the edge detection unit.

17. An edge detection method, comprising:
a detection step of detecting a dispersion degree of gradation values of input image data whose resolution is lower than an output resolution;
a determination step of determining detection sensitivity, which is edge detectability, based on the dispersion degree detected in the detection step;
an edge detection step of detecting an edge from an input image based on the input image data, at the detection sensitivity determined in the determination step; and
a scaling step of outputting image data generated by converting the input image data to the output resolution in accordance with the detected edge, wherein
with respect to first and second cases in which the dispersion degree is lower in the first case than the dispersion degree in the second case, the determination step determines a detection sensitivity that is lower in the first case and higher in the second case.

18. A non-transitory computer readable medium that stores a program, wherein
the program causes a computer to execute:
a detection step of detecting a dispersion degree of gradation values of input image data whose resolution is lower than an output resolution;
a determination step of determining detection sensitivity, which is edge detectability, based on the dispersion degree detected in the detection step;
an edge detection step of detecting an edge from an input image based on the input image data, at the detection sensitivity determined in the determination step; and
a scaling step of outputting image data generated by converting the input image data to the output resolution in accordance with the detected edge, wherein
with respect to first and second cases in which the dispersion degree is lower in the first case than the dispersion degree in the second case, the determination step determines a detection sensitivity that is lower in the first case and higher in the second case.

19. An edge detection apparatus, comprising at least one processor that operates as:
a detection unit configured to detect a dispersion degree of gradation values of input image data whose resolution is lower than an output resolution;
a determination unit configured to determine detection sensitivity, which is edge detectability, based on the dispersion degree detected by the detection unit;
an edge detection unit configured to detect an edge from an input image based on the input image data, at the detection sensitivity determined by the determination unit; and
a scaling unit configured to output image data generated by converting the input image data to the output resolution in accordance with the detected edge, wherein
with respect to first and second cases in which the dispersion degree is lower in the first case than the dispersion degree in the second case, the determination unit determines a detection sensitivity that is lower in the first case and higher in the second case.

* * * * *